(12) United States Patent
Chiang et al.

(10) Patent No.: US 7,133,227 B2
(45) Date of Patent: Nov. 7, 2006

(54) HEAD POLARITY DETECTION ALGORITHM AND APPARATUS

(75) Inventors: TaiVie Chiang, Singapore (SG);
WingKong Chiang, Singapore (SG);
KianKeong Ooi, Singapore (SG);
KianSoon Yeo, Singapore (SG);
MingZhong Ding, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 172 days.

(21) Appl. No.: 10/761,475

(22) Filed: Jan. 21, 2004

(65) Prior Publication Data

US 2005/0157415 A1  Jul. 21, 2005

(51) Int. Cl.
*G11B 27/36* (2006.01)
(52) U.S. Cl. ........................................ 360/31
(58) Field of Classification Search .............. None
See application file for complete search history.

(56) References Cited

U.S. PATENT DOCUMENTS

| 5,341,249 A | 8/1994 | Abbott |
| 5,345,342 A | 9/1994 | Abbott |
| 5,422,760 A | 6/1995 | Abbott |
| 5,640,583 A | 6/1997 | Assouad |
| 5,739,969 A * | 4/1998 | Garza ........................... 360/51 |
| 6,369,969 B1 * | 4/2002 | Christiansen et al. ......... 360/66 |
| 7,002,883 B1 * | 2/2006 | Nakamura et al. ....... 369/47.22 |
| 2002/0024753 A1 * | 2/2002 | Uno ............................. 360/51 |

OTHER PUBLICATIONS

"Signal Processing for Single and Dual Element Unshielded Magnetoresistive Heads" by Koren, IEEE Transactions on Magnetics, vol. 31, No. 2 Mar. 1995.*
"Modulation Codes for the COntrolled Polarity Channel" by Swanson, IEEE Transactions on Magnetics, vol. 32, No. 5, Sep. 1996.*

* cited by examiner

*Primary Examiner*—Wayne Young
*Assistant Examiner*—Glenda P. Rodriguez
(74) *Attorney, Agent, or Firm*—John D. Veldhuis-Kroeze; Westman, Champlin & Kelly, P.A.

(57) ABSTRACT

A method of determining and monitoring head polarity of data heads comprises performing a head polarity detection routine. The head polarity detection routine comprises the step of setting a read gate period duration to a first value. The routine also comprises searching for a good address mark signal during a first read gate period with a channel polarity set to a first polarity. The routine further comprises identifying a polarity of a data head based upon the channel polarity when the good address mark is detected.

16 Claims, 11 Drawing Sheets

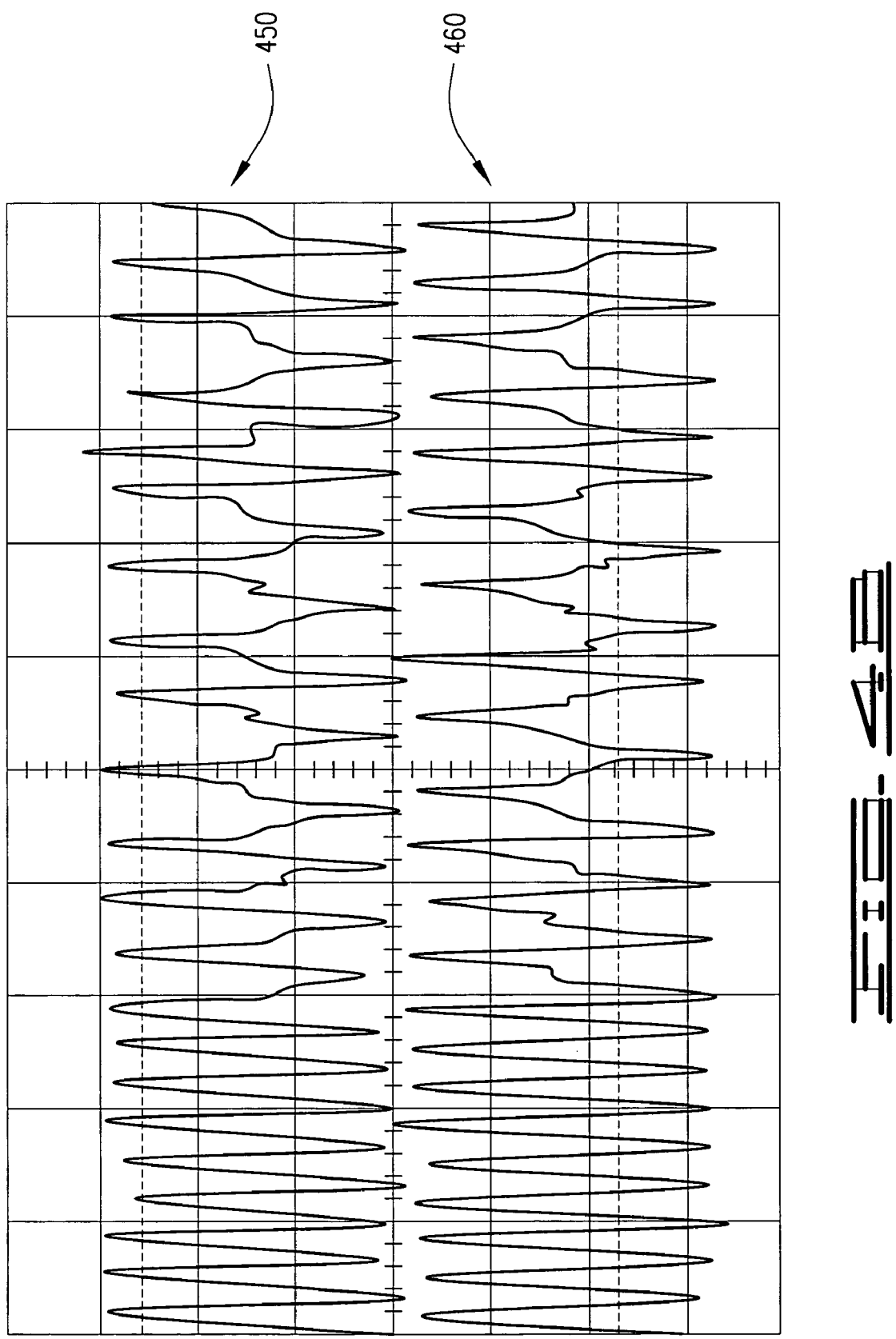

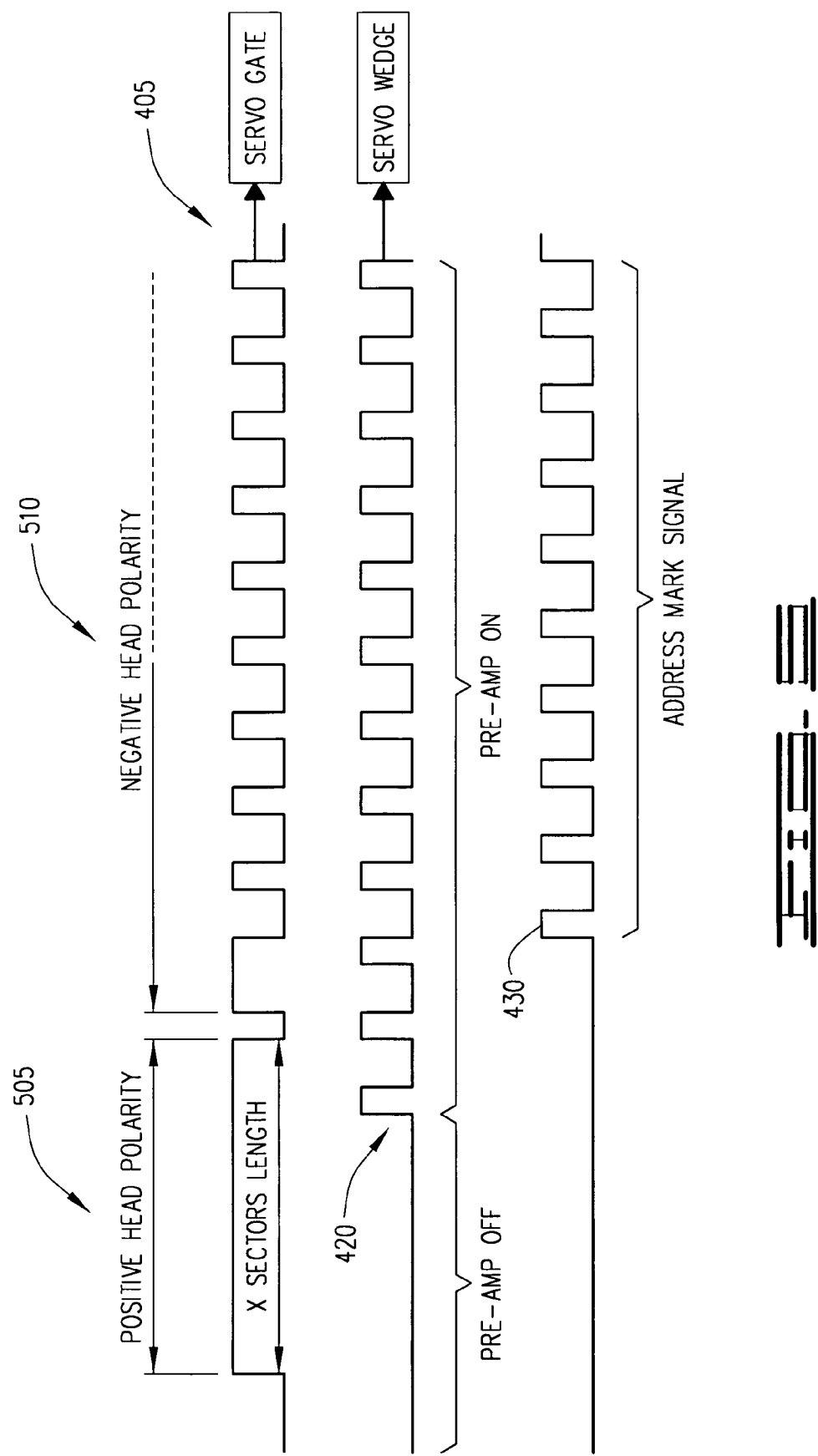

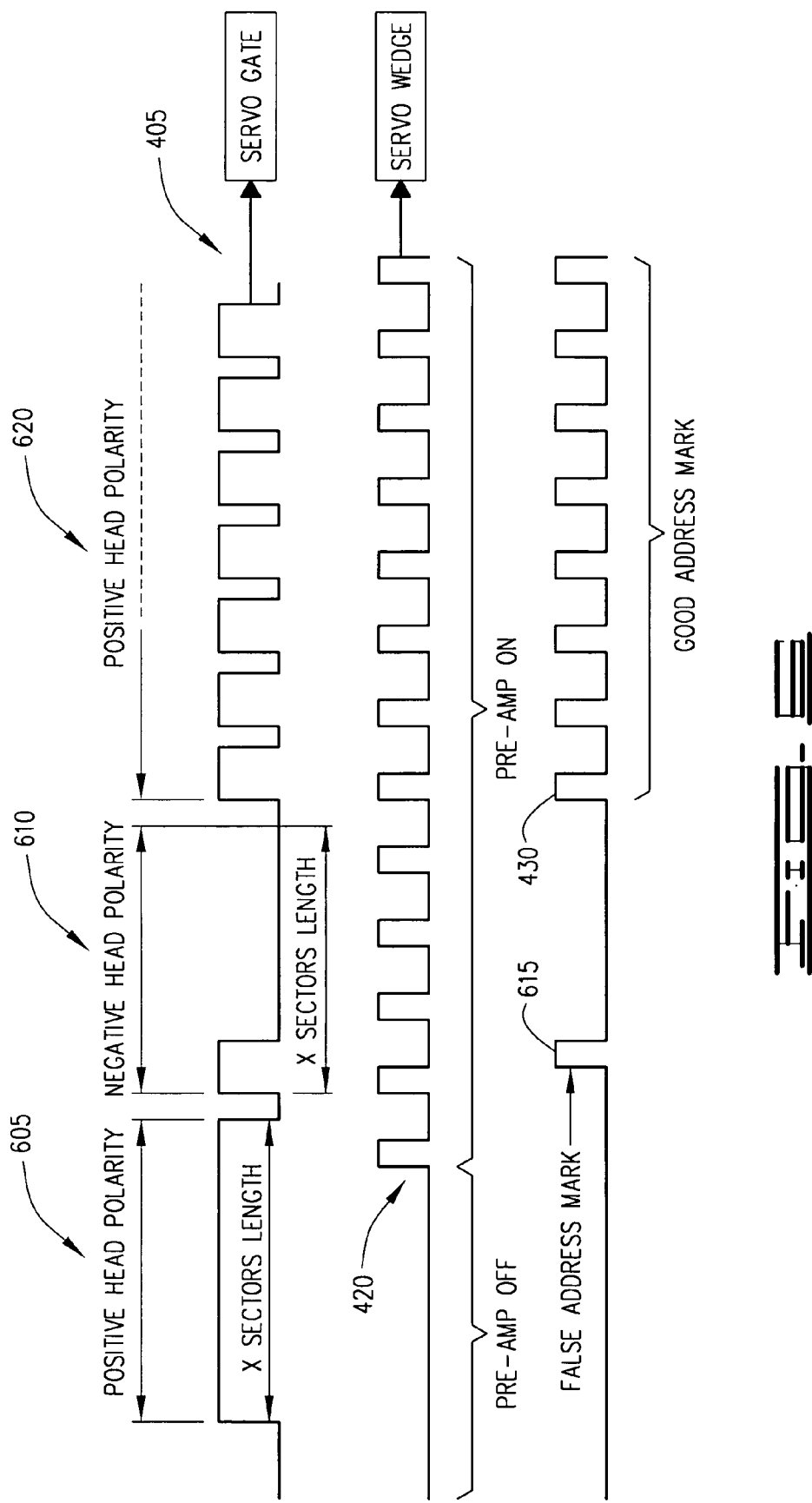

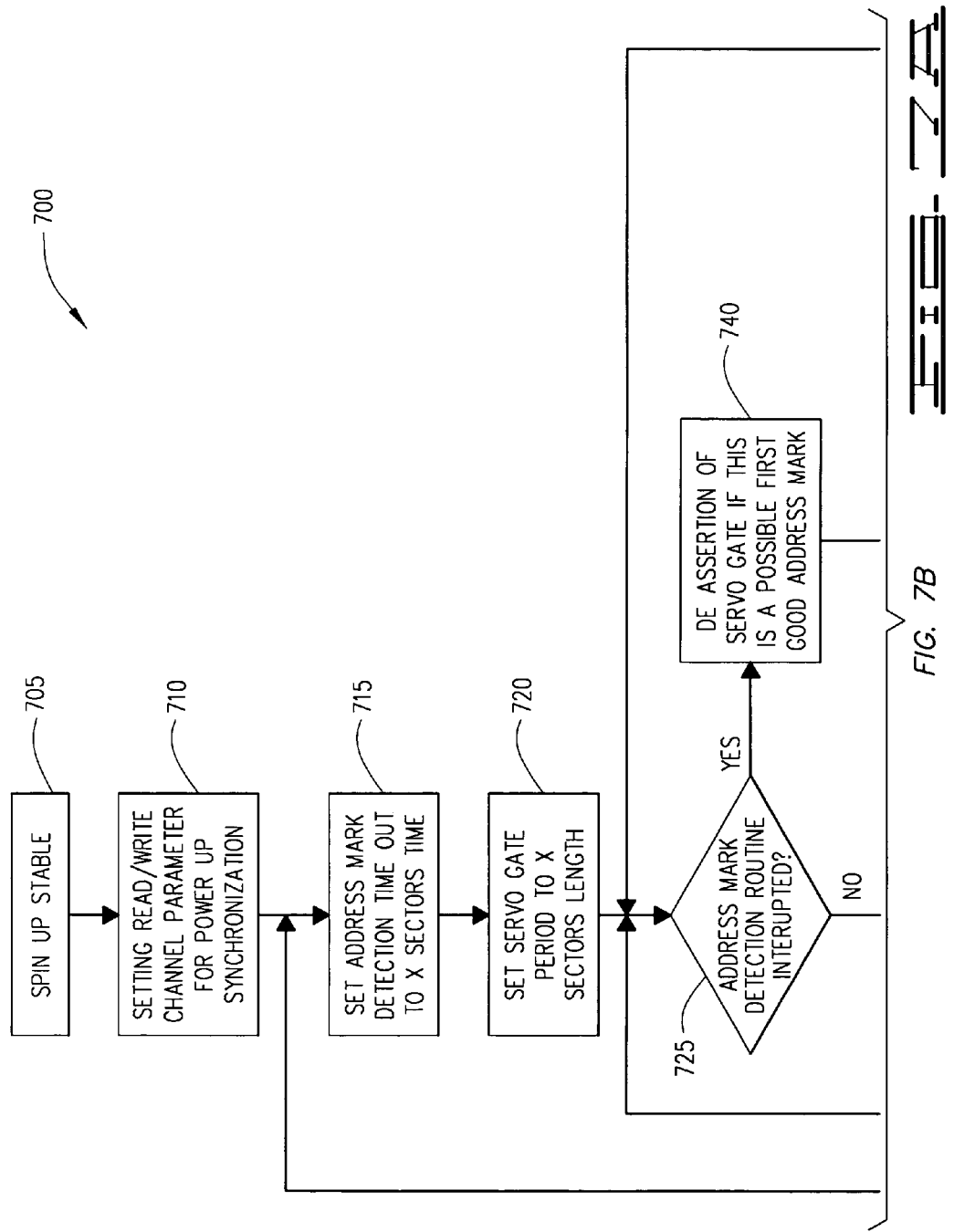

| | POLARITY | NUMBER OF FLIPS |
|---|---|---|
| HEAD 0 | | |
| HEAD 1 | | |
| HEAD 2 | | |
| HEAD 3 | | |
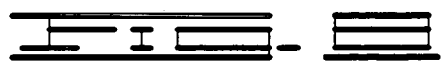
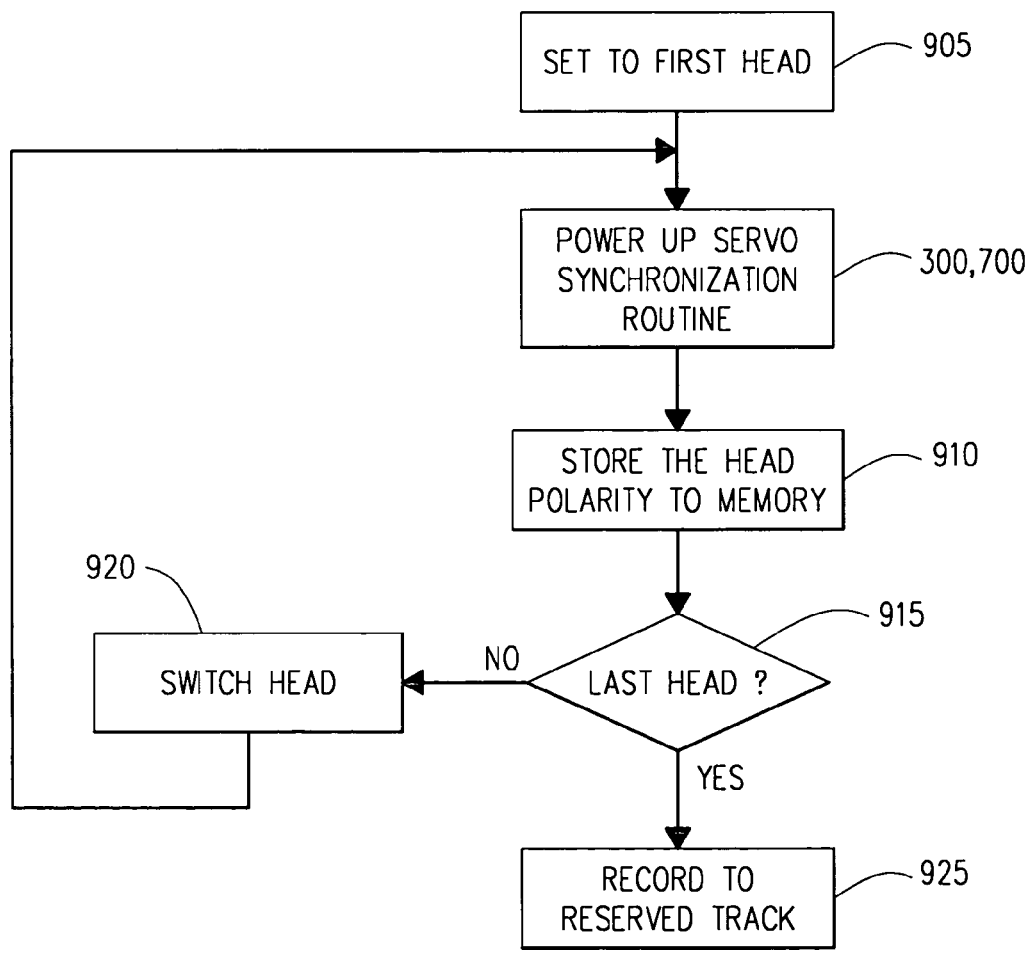
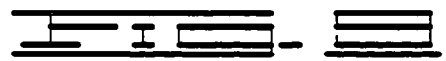

HEAD POLARITY DETECTION ALGORITHM AND APPARATUS

FIELD OF THE INVENTION

The present invention relates generally to data heads, and more particularly but not by limitation to head polarity in data heads.

BACKGROUND OF THE INVENTION

In data storage systems, data is recorded on a storage media, typically in data tracks. For example, in disc drive data storage systems, data is written in circular concentric data tracks on the surface(s) of one or more data storage discs. In magnetic disc drive data storage systems, advancement in material science has allowed magnetic data to be written on the media at greater track pitch per inch (TPI) densities than had previously been possible. One factor which makes recording at higher TPI densities possible is a reduction of the transducer's geometry. Synthetic anti-ferromagnetic (SAF) transducers have been used in magnetic storage systems to achieve higher TPI (for example, 130 TPI). The properties of SAF transducers have proven to provide good thermal performance, amplitude response, amplitude asymmetry sigma, and component stability as compared to other transducer types.

However, one problem which can occur with SAF transducers is that they frequently exhibit polarity flip behavior. A polarity flip, or polarity flip behavior, is where a read back signal from a data head inverts from its original or previous polarity. Inversion of the read back signal will result in data errors. Transducers such as SAF transducers are sensitive to polarity flips, and particularly to flips to negative polarity. Transducers will also give a reverse polarity reading of the read back signal if the transducer wire is soldered in a reverse orientation. In order to implement proper decoding, the read/write channel requires that the signal polarity state be known and correct. Therefore, there is a need for methods and apparatus which can accurately detect head polarity and head polarity flips automatically.

Embodiments of the present invention provide solutions to these and/or other problems, and offer other advantages over the prior art.

SUMMARY OF THE INVENTION

A method of determining and monitoring head polarity of data heads comprises performing a head polarity detection routine. The head polarity detection routine comprises the step of setting a read gate period duration to a first value. The routine also comprises searching for a good address mark signal during a first read gate period with a channel polarity set to a first polarity. The routine further comprises identifying a polarity of a data head based upon the channel polarity when the good address mark is detected.

In some embodiments, if the good address mark is not found during the first read gate period, then prior to the identifying step the head polarity detection routine further comprises toggling the polarity of the channel to a second polarity, and searching for the good address mark during a second read gate period with the channel polarity set to the second polarity. In still more specific embodiments, the head polarity detection routine further comprises repeating the steps of searching for the good address mark during subsequent read gate periods until the good address mark is found, with the polarity of the channel being toggled between the first and second polarities after the completion of each read gate period in which the good address mark is not found.

In some embodiments, the head polarity detection routine step of setting the read gate period duration to the first value further comprises setting a servo gate period duration to a time corresponding to a predetermined number of servo sectors.

Other features and benefits that characterize embodiments of the present invention will be apparent upon reading the following detailed description and review of the associated drawings.

BRIEF DESCRIPTION OF THE DRAWINGS

FIG. 4B is a plot illustrating a servo signal relative to a polarity flipped servo signal.

FIG. 5 is a servo gate timing diagram illustrating address mark timing for a good address mark.

FIG. 6 is a servo gate timing diagram illustrating address mark timing with a false address mark.

FIG. 8 is an illustration of a head polarity data log.

FIG. 9 is a flow diagram illustrating methods of determining the polarity of a multiple data heads system, during a certification phase, for recording in reserved tracks or other memory locations.

DETAILED DESCRIPTION OF ILLUSTRATIVE EMBODIMENTS

Figure 1:
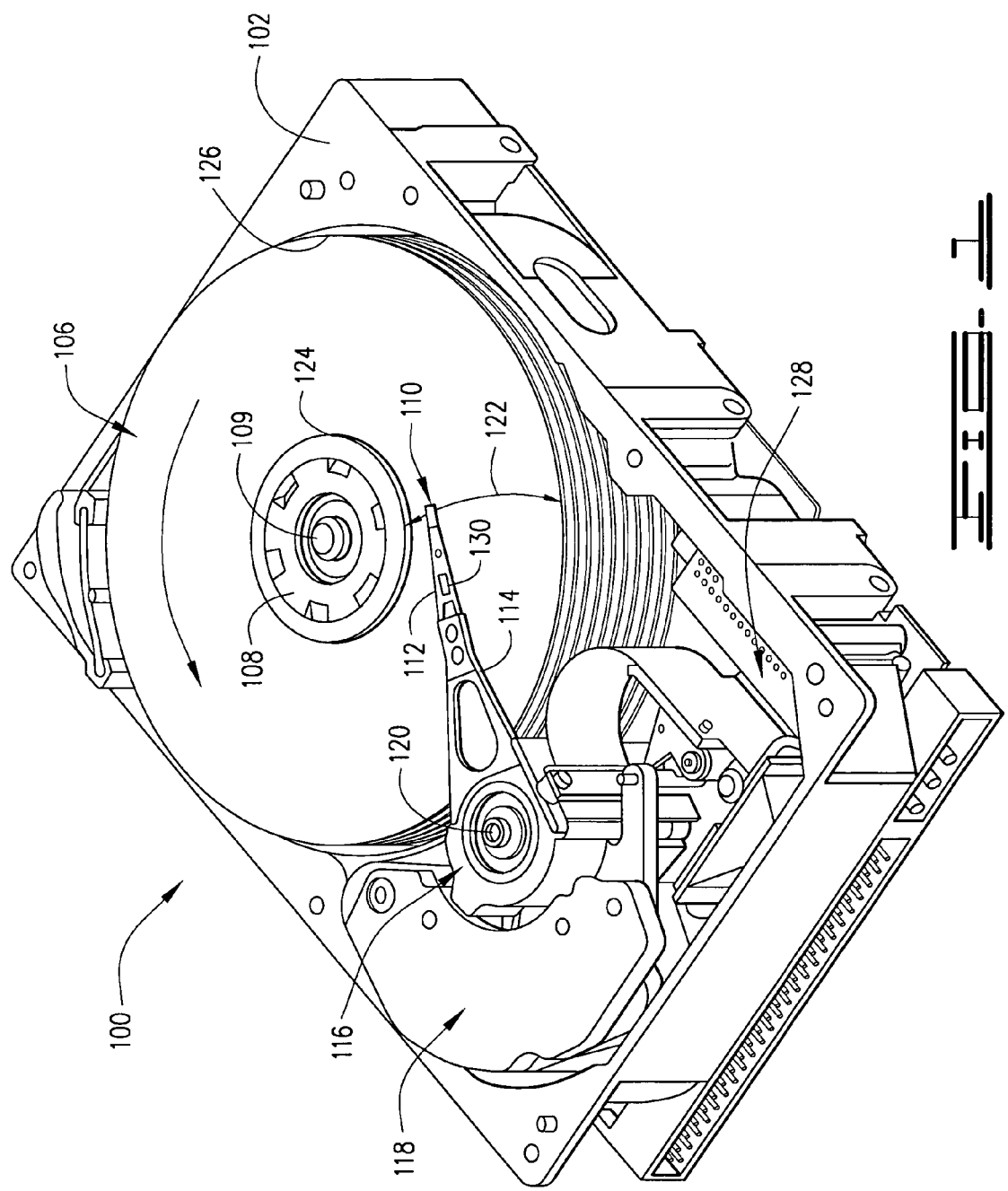
FIG. 1 is an isometric view of a disc drive.

FIG. 1 is an isometric view of a disc drive 100 in which embodiments of the present invention are useful. Disc drive 100 includes a housing with a base 102 and a top cover (not shown). Disc drive 100 further includes a disc pack 106, which is mounted on a spindle motor (not shown) by a disc clamp 108. Disc pack 106 includes a plurality of individual discs, which are mounted for co-rotation about central axis 109. Each disc surface has an associated disc head slider 110 which is mounted to disc drive 100 for communication with the disc surface. In the example shown in FIG. 1, sliders 110 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118. Voice coil motor 118 rotates actuator 116 with its attached heads 110 about a pivot shaft 120 to position heads 110 over a desired data track along an arcuate path 122 between a disc inner diameter 124 and a disc outer diameter 126. Voice coil motor 118 is driven by servo electronics 130 based on signals generated by heads 110 and a host computer (not shown).

Figure 2:
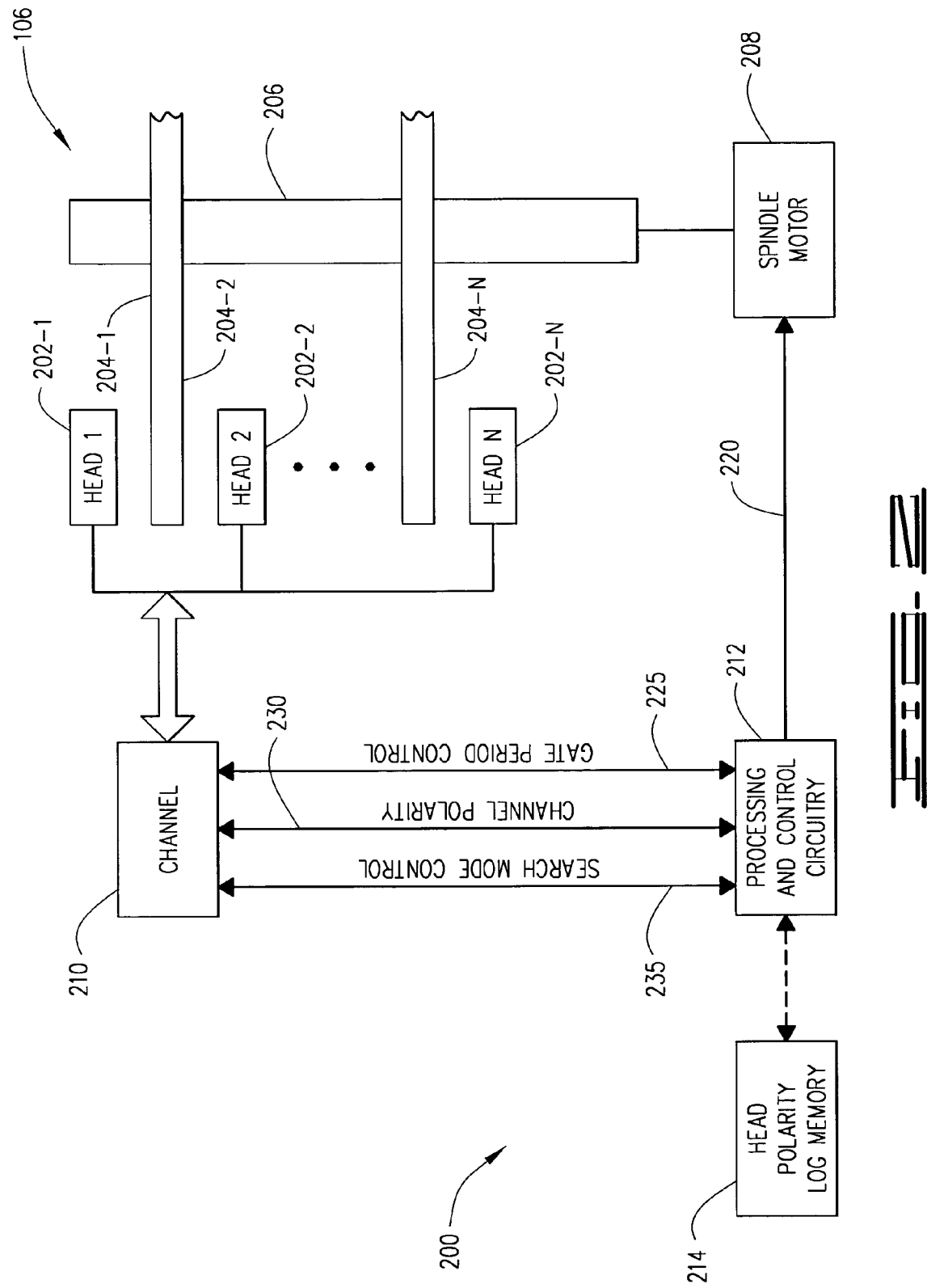
FIG. 2 is a block diagram of a data storage system in accordance with embodiments of the present invention.

FIG. 2 is a block diagram illustrating data storage system 200 which is configured to implement head polarity detection methods of the present invention. Data storage system 200 can be, for example, an embodiment of disc drive 100 shown in FIG. 1. However, data storage system 200 is not limited to disc drive data storage systems. For example, the present invention can be used in tape drives or other types of data storage systems. Also, the present invention can be used in systems, other than data storage systems, which include a data head having a head polarity.

In an example embodiment, data storage system 200 includes one or more data heads 202 (HEAD 1 202-1 through HEAD N 202-N are shown). Each head is positioned to read data from a corresponding media surface 204 (media surfaces 204-1 through 204-N are shown). In one particular embodiment, heads 202 are magnetic data heads, for example SAF transducer carrying heads, while media surfaces 204 are magnetically encodable surfaces. However, the present invention is not limited to this particular type of head or encodable data surface. In embodiments in which system 200 is a disc drive data storage system, encodable media surfaces 204 are provided on disc pack 106 mounted on spindle 206 of spindle motor 208.

System 200 also includes a channel 210 having one or more components which process servo and other data read from media surfaces 204 by data heads 202. Processing and control circuitry 212 includes suitably programmed processors, firmware and/or other circuitry which is configured to control certain operations of data storage system 200. For example, as illustrated, circuitry 212 generates control signal 220 for controlling spindle motor 208, gate period control signal 225 for controlling a servo read gate period duration of channel 210, channel polarity control signal 230 for toggling the channel polarity used in reading and processing data from heads 202, and a search mode control signal which causes channel 210 to enter or exit a search mode. These control signals and the channel parameters or modes of operation which they control are described below in greater detail.

Processing and control circuitry 212 can also be used to control other features and functions of data storage system 200. While circuitry 212 is shown as a single processing block in FIG. 2, the functions implemented by circuitry 212 can be separated and implemented in any desired number of processing circuits, firmware, etc. These processing functions can also be implemented in a host computing system, or they can be integrated with the channel. As is described below in greater detail with reference to FIGS. 3–10, circuitry 212 and channel 210 together operate to identify the polarity of each of data heads 202-1 through 202-N. The head polarity of the various data heads is then stored in head polarity log 214. Head polarity log 214 can be stored in a separate memory associated with circuitry 212, or on reserved tracks of media 204.

Figure 3:
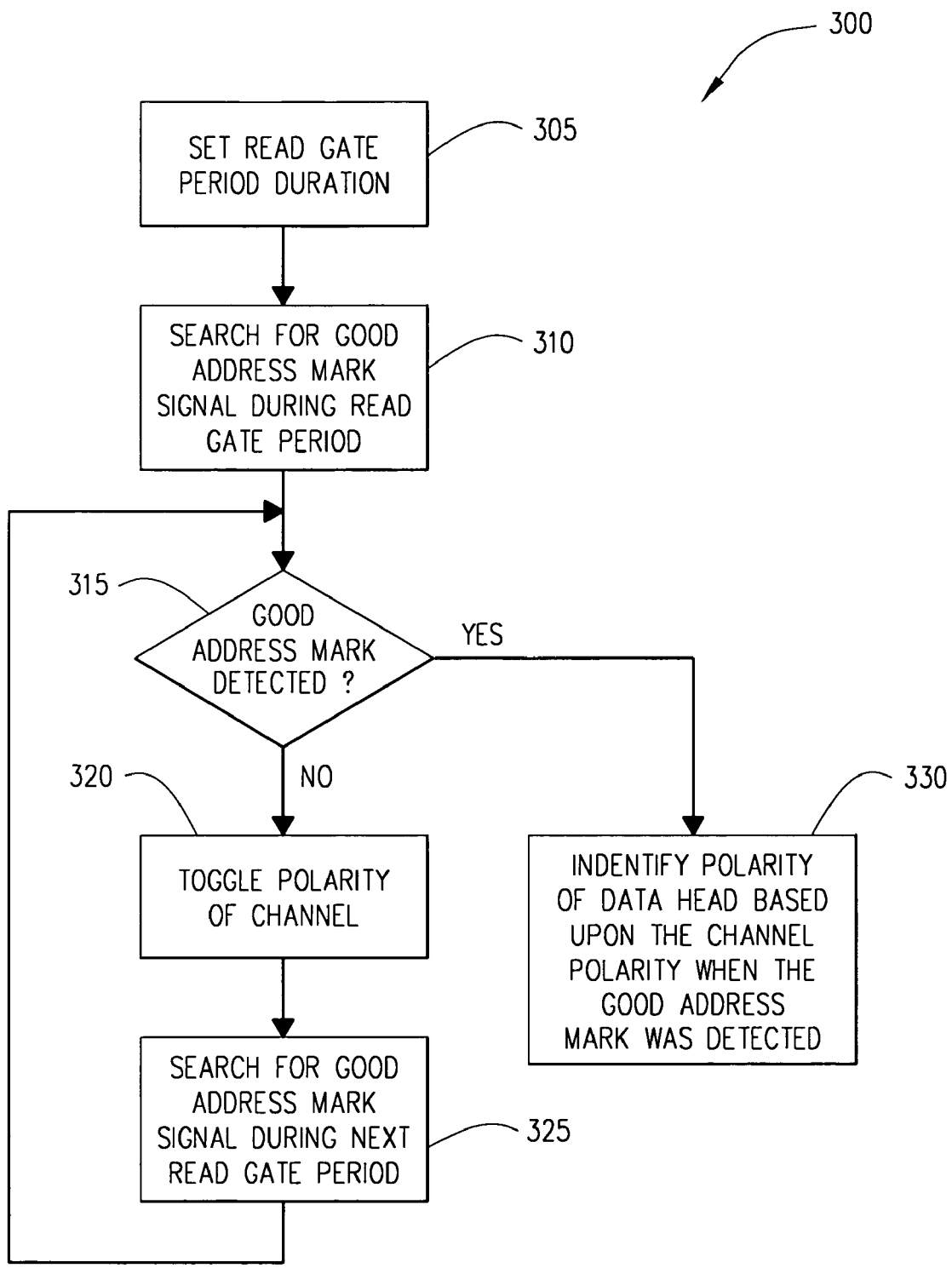
FIG. 3 is a flow diagram illustrating a method in accordance with embodiments of the present invention.

The present invention includes a head polarity detection routine, in the form of a method or algorithm which can be implemented for example in channel 210 and circuitry 212, which is useful in automatically detecting head polarity. The routine can be executed at various times, including during power-up of the system, during a pre-certification stage, and during operation to detect operational mode head polarity flips. Embodiments of the routine are described in varying detail as described below FIG. 3 is a flow chart 300 illustrating a first general embodiment of a head polarity detection routine or method in accordance with the present invention. The routine described in flow chart 300 is first described in general terms, and then with reference to more specific examples of a power-up servo timing sequence which facilitates the automatic head polarity detection methodology. This routine eliminates the need to know the head polarity prior to the power-up synchronization common to data storage systems. Using the routine, head polarity detection is performed on the fly, involving two primary stages: read/write channel parameter setting, and servo head polarity timing sequence detection.

As shown at block 305 in FIG. 3, the head polarity detection routine includes setting a read gate period duration. The read gate period duration is set to a first value, which in some embodiments is a time corresponding to the time required to read a predetermined number of servo sectors. In data storage systems, it is common for a servo read gate of the channel to be enabled for a time equivalent to one servo sector during normal operation to allow the servo information to be read, but for a longer period of time during system synchronization. During system synchronization, when searching for an address mark to initially synchronize the servo system, the servo read gate is opened for a longer period of time. The present invention uses this longer read gate period duration for detecting head polarity. In FIG. 2, setting of the read gate period duration is diagrammatically illustrated as being controlled by signal 225.

Next, after setting the read gate period duration, the head polarity detection routine searches for a good address mark signal during a first read gate period with the channel polarity set to a first polarity. This is illustrated in FIG. 3 at block 310. At block 315, a determination is made as to whether a good address mark has been detected during the first read gate period. Whether or not an address mark is a "good" address mark is determined using a qualification criteria, for example a gray code qualification, as is known in the art. If it is determined that a good address mark has not been detected, then the polarity of channel 210 is toggled to a second polarity, for example using control signal 230 in FIG. 2. This is illustrated at block 320. Then with the toggled polarity, as illustrated at block 325 a search is conducted for a good address mark signal during a second (or next) read gate period. This process is repeated until a good address mark is found. Once a good address mark is detected, the polarity of the data head is identified based upon the current channel polarity. This is illustrated in FIG. 3 at block 330.

A further discussion of the steps shown in FIG. 3 is provided in the context of an example of the functionality of typical data storage systems which can be used to implement the routine. As is typical, channel 210 in a data storage system 200 is configured to implement a search mode of operation. This search mode of operation (i.e., search mode function), which is for illustrative purposes shown as being controlled by search mode control signal 235 in FIG. 2, is typically used at the beginning of a power-up synchronization stage of data storage system 200 to locate an address mark for purposes of synchronization. This is sometimes referred to as an "address mark time out interrupt." At the beginning of operation of data storage system 200, it is necessary to search for a valid address mark servo signal. Since it is difficult to predict where the first valid address mark will be located, the servo read gate is set wider than normal to search for the servo signal. While this search mode is primarily used to search for a valid servo signal during power-up, in the present invention, this search mode function is also used to search for a valid address mark servo signal for purposes of head polarity detection.

In one embodiment of the present invention, the read gate period duration is set to a period of X servo sectors, where X is an integer value greater than two. For example, in one exemplary embodiment, the servo read gate period duration is set to either three or four servo sectors. Widening the read gate period duration to search for the address mark allows noise (i.e., non-servo signals) to be introduced into the channel 210. Thus, the search mode necessarily utilizes more stringent screening of signals processed by channel 210. For example, more stringent screening of signals while in the search mode can include detection of a preamble of a signal using a narrow band pass filter implemented within channel 210. As a screening criteria, once the energy at the preamble frequency exceeds a threshold, then the preamble of the signal can be determined to have been detected.

Figure 4A:
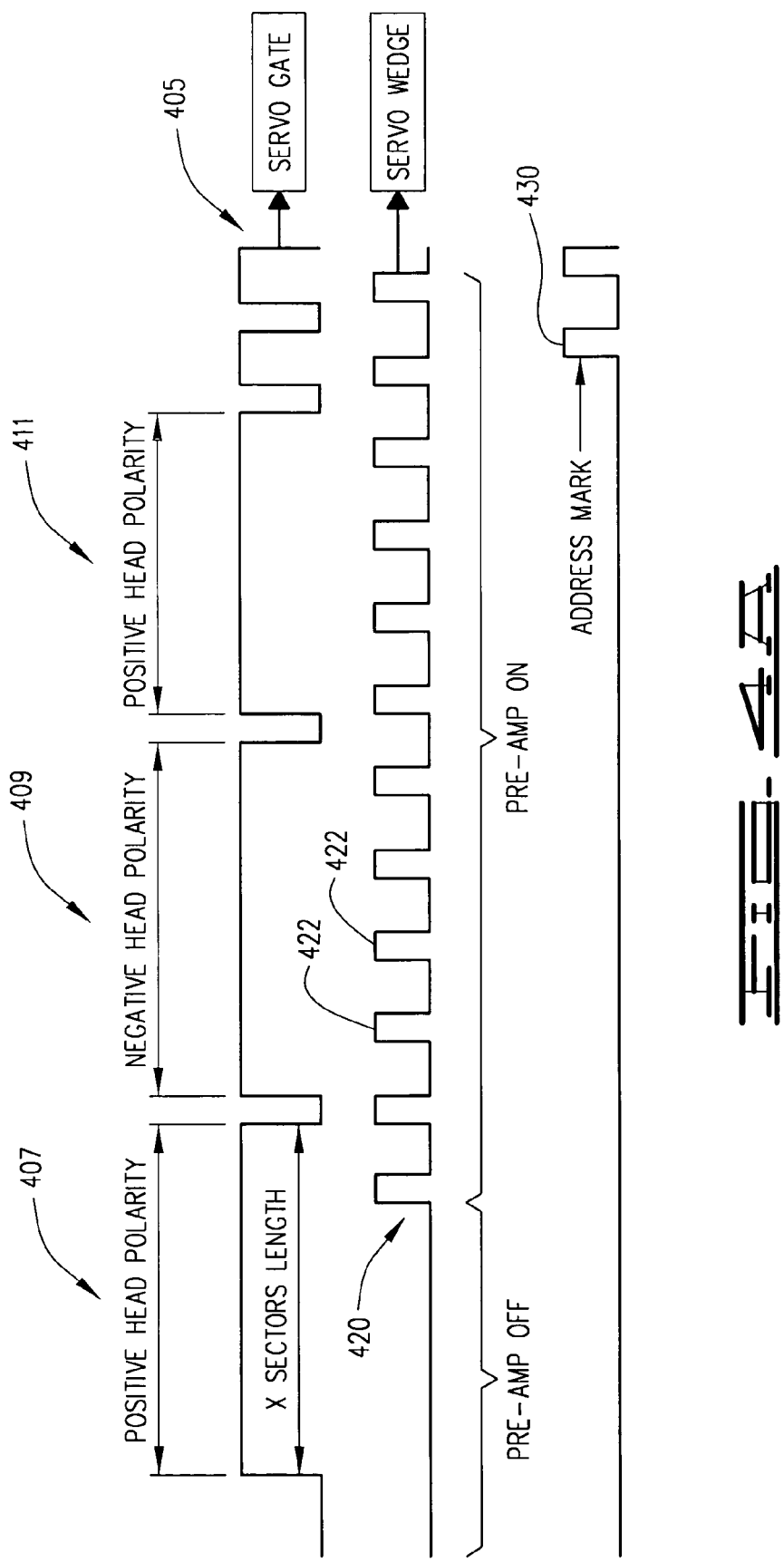
FIG. 4A is a servo gate timing diagram.

Setting the channel parameters for the search mode function as described is initiated once the hard disc has achieved stability in spin up. With the servo gate period widened to X servo sectors, any servo signals located within this gate period are captured. At the interval of X sectors, the polarity in the read/write channel is toggled. FIG. 4-1 shows the timing for each new servo gate during power up servo synchronization.

As illustrated diagrammatically in FIG. 4-1, servo gate 405 is set to X servo sectors in duration, with the duration of a servo sector being represented as the period of the servo wedge waveform 420 (i.e., the period between the starts of consecutive wedges represented by pulses 422). As can be seen in FIG. 4-1, while searching for an address mark 430, the head polarity is toggled between consecutive read gate periods (i.e., between read gate periods 407 and 409, and between read gate periods 409 and 411).

Generally, the timing of the address mark time out interrupt is synchronous with the start and end of the servo gate. If no address mark signal has been detected at the end of the servo gate, the address mark time out interrupt routine will toggle the polarity of the read/write channel 210, and the servo gate of X sectors in length will be re-asserted. For a data storage system which possesses a reverse polarity head, the read back signal will be reversed (i.e., if the actual data is written as "10101", it will read back as "01010"). An example of a normal polarity signal 450 and its corresponding reverse polarity signal 460 is shown in FIG. 4-2. The read back signal can be negated internally by changing the polarity state in the read/write channel. The toggling of channel polarity continues in every address mark time out interrupt until a good address mark is detected. Again, an address mark signal is considered good when the servo signal gray code is qualified to be good using a predetermined criteria.

FIG. 5 illustrates an example of the timing when a good address mark 430 is detected. As illustrated, since no good address mark is detected during read gate period 505, the channel polarity is toggled from positive to negative. Good address mark 430 is then detected during read gate period 510. With the qualification of the first address mark signal 430, the algorithm re-computes the next servo wedge timing. The subsequent servo gate period is then reset for the acquiring of one servo wedge.

Referring now to FIG. 6, an example of servo read gate timing is shown for the case where there is a false address mark event. As shown in FIG. 6, no address marks are detected during read gate period 605. With the channel polarity toggled, there is address mark detection during the next read gate period 610. At the event where there is address mark detection, the servo gate 405 is de-asserted before the X servo sector length period is completed. If the detected address mark signal 615 fails the criteria to be qualified as a good address mark (i.e., if address mark signal 615 is a "false address mark"), the algorithm waits for the next polarity toggling event before re-asserting the servo gate (again having a period duration of X servo sectors in length). An example of the next polarity toggling event is the expiration of the X servo sector gate period 610. Upon again toggling the channel polarity at the expiration of period 610, the search for a good address mark signal 430 resumes in period 620.

Figures 7A, 7B:
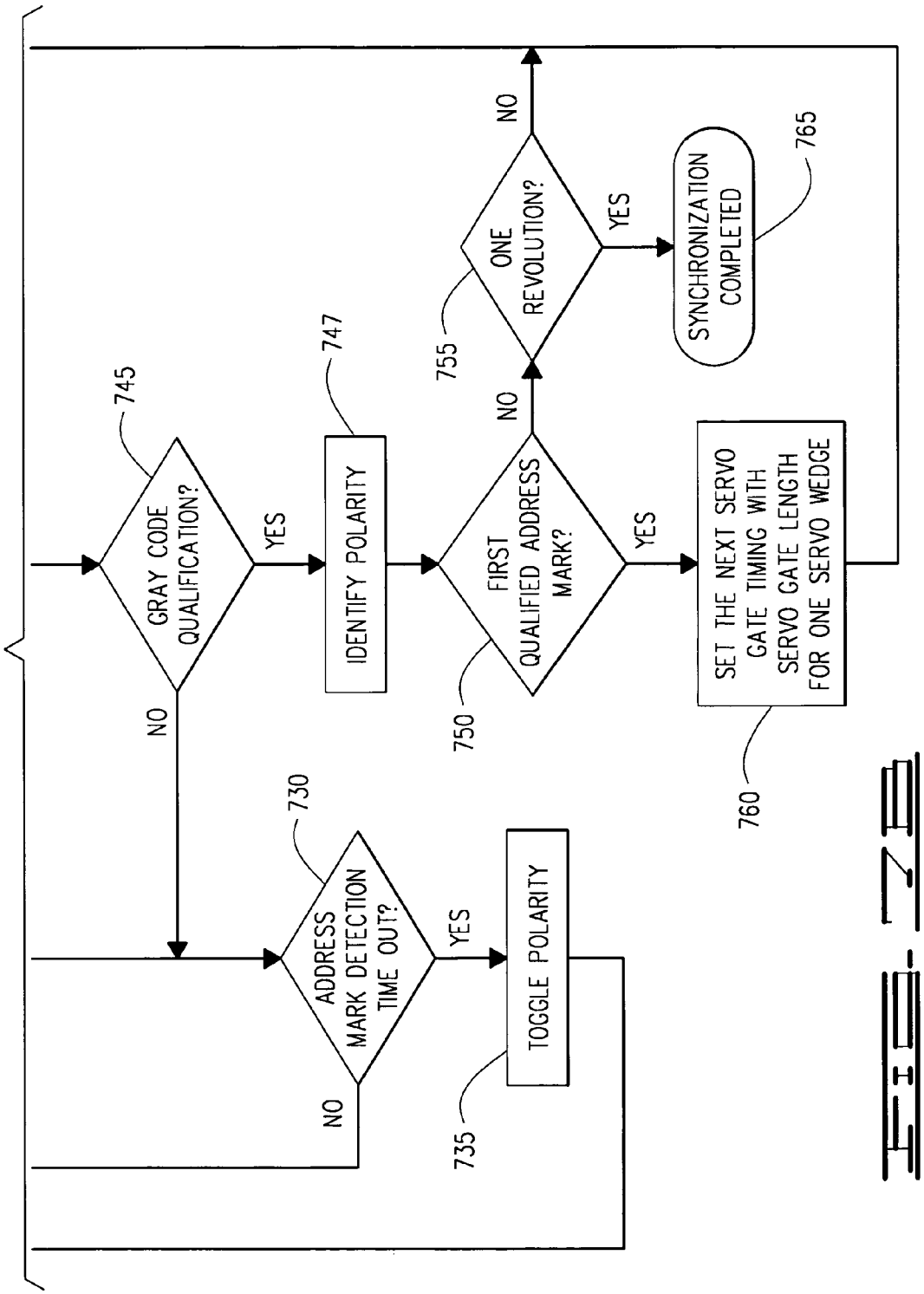
FIG. 7 is a flow diagram illustrating embodiments of the present invention in greater detail.

FIG. 7 is a flow diagram 700 illustrating an address mark detection routine. This routine is described with reference to a disc drive data storage system, but those of skill in the art will understand that adaptation of this routine to other types of systems is possible. As shown in blocks 705 and 710, after the spin up of the data storage disc(s) has stabilized, the read/write channel parameters are set for power-up synchronization. In the step illustrated at block 715, the address mark detection time out length is set to the time required to traverse X servo sectors or wedges. Similarly, in step 720 the servo read gate period duration is set to a length of X sectors.

As shown at 725 in FIG. 7, while searching for an address mark during a read gate period, a decision is made as to whether the address mark detection routine has been interrupted, for example because of detection of a potential address mark. If the address mark detection routine has not been interrupted, it is next determined whether the address mark detection time out is completed or expired, as shown in FIG. 7 at 730. If the address mark detection time out is not completed, then the decisions at steps 725 and 730 are repeated either until the time out is completed, or until the address mark detection routine has been interrupted. If the address mark detection time out expires before the address mark detection routine is interrupted, the polarity of the channel is toggled as shown at block 735, and the method returns to step 715.

If it is determined at step 725 that the routine has been interrupted, and if the reason for interruption is the potential detection of a good address mark, then at step 740 the servo read gate is de-asserted. Then, at step 745 it is determined whether the potential address mark qualifies as a good address mark using a gray code qualification criteria, for example. If it is determined that the potential address mark does not qualify at step 745, then the method returns to step 730. If however the address mark qualifies as a good address mark, then as described above with reference to flow chart 300 shown in FIG. 3, the head polarity is known based upon the current channel polarity. This is also represented at step 747 where the head polarity is determined based upon the channel polarity. Also, if the address mark qualifies as a good address mark, at step 750 it is determined whether this is the first qualified address mark. If it is not the first qualified address mark, and if the disc(s) have completed a full revolution as determined at step 755, then the synchronization process is complete as indicated at 765. However, if the disc(s) have not completed one revolution, then the method returns to step 725. The method also returns to step 725 if it is determined at step 750 that the good address mark was the first qualified address mark. In this instance, the servo read gate period duration for the next read gate period is set to the length of one servo wedge for normal operation as shown at step 760.

Prior knowledge of head polarity is important, particularly for disc drive data storage systems (or other types of systems) with multiple data heads. Initial head polarity information is obtained during a certification phase. During the certification phase, each head will go through servo synchronization to obtain its head polarity. Once the polarity of all heads is detected, circuitry 212 stores this information in a head polarity data log such as the one shown in FIG. 8. Typically, the head polarity data log is stored in a reserved track of the storage media, but it can also be stored elsewhere. In one embodiment, the head polarity data log contains the information shown in FIG. 8, namely the current polarity and number of polarity flips for each particular head. Information such as the polarity and the number of polarity flips is used for head switch operations, and for reliability performance analysis. The number of polarity flips can be set to zero after the initial stage of certification.

A certification phase method of determining the polarity of a multiple data heads storage system is illustrated in flow diagram 900 shown in FIG. 9. Once all the non-first head polarities are determined, this information can be stored in a memory location, such as reserved tracks on a storage disc, for later use. As shown at block 905, in the method the channel and other circuitry is set to monitor a first data head. Then, the power up synchronization routine 300/700 is called to determine the polarity of the first data head. After determining the polarity of the head, this information is stored to memory as shown at 910. At step 915 it is determined whether the polarity of all heads have been determined, and if not, then at step 920 the channel and other circuitry is set to monitor the next data head. The routine 300/700 and steps 910 and 915 are then repeated until the polarity of all the non-first heads have been determined. At that point, at step 925, the polarity data log is recorded in the reserved track(s) or elsewhere if desired.

Figure 10:
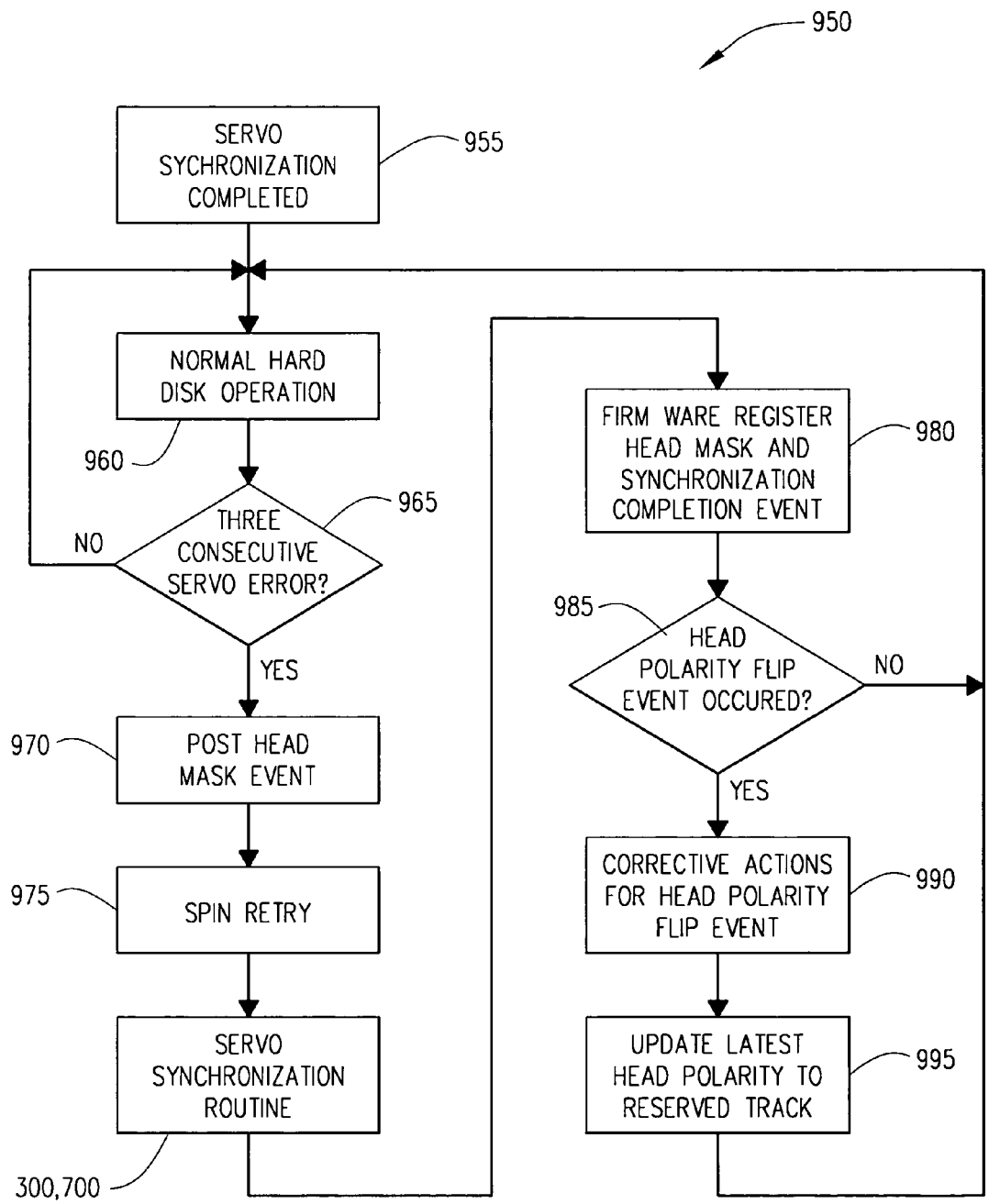
FIG. 10 is a flow diagram illustrating a recovery method used when a predetermined number of servo errors occur consecutively.

Head polarity may also reverse or flip during operational of the data storage system, for example as a result of hitting debris on the media surface. Any head polarity flip during operation will result in a servo error. The servo error may be reported as either missing the address mark, or as a bad sample if a false address mark is generated. The method illustrated in flow chart 950 shown in FIG. 10 is used to detect and record these operation mode head polarity flips.

After servo synchronization is completed (step 955), and while normal system operation is underway (step 960), the method includes the step 965 of determining whether a predetermined number of consecutive servo errors have occurred. In FIG. 10, this step is illustrated by way of example as being a determination as to whether three consecutive servo errors have occurred. However, other numbers of consecutive servo errors can also be used as the criteria in this step. If the predetermined number of servo errors have not occurred, then the method repeats steps 960 and 965 until such an event does occur.

Upon three consecutive servo errors being detected, the method notifies processing circuitry 212 and channel 210 at step 970 that a head mask event has occurred, and attempts a spin retry at step 975. During the spin retry and once a stable spin is achieved, the method calls the routine 300/700 to identify the head polarity of the data heads, and thereby whether a polarity flip has occurred. After servo synchronization is completed (step 980), the circuitry 212 determines at step 985 whether a head polarity flip event has occurred as compared to the polarity states logged in the reserve track. If no head polarity flip event has occurred, then the method returns to step 960. If a head polarity flip event has occurred, at step 990 circuitry 212 executes corrective actions (e.g., setting channel polarity, etc.) required to compensate for the head polarity flip event. Then, the updated head polarity data log is stored, and the method returns to step 960.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the head polarity detection algorithm and apparatus, while maintaining substantially the same functionality without departing from the scope and spirit of the present invention. In addition, although the preferred embodiment described herein is directed to a data storage system, it will be appreciated by those skilled in the art that the teachings of the present invention can be applied to other systems in which head polarity detection is useful, without departing from the scope and spirit of the present invention.

What is claimed is:

1. A method comprising:
   performing a transducer polarity detection routine comprising the steps of:
      searching for a good address mark signal during a first read gate period with a channel polarity set to a first polarity;
      toggling the polarity of the channel to a second polarity if the good address mark is not found during the first read gate period;
      searching for the good address mark during a second read gate period with the channel polarity set to the second polarity; and
      identifying a polarity of a transducer based upon the channel polarity when the good address mark is detected.

2. The method of claim 1, wherein the transducer polarity detection routine further comprises repeating the steps of searching for the good address mark during subsequent read gate periods until the good address mark is found, the polarity of the channel being toggled between the first and second polarities after the completion of each read gate period in which the good address mark is not found.

3. The method of claim 2, and further comprising setting a read gate period duration to a first value by setting a servo gate period duration to a time corresponding to a predetermined number of servo sectors.

4. The method of claim 3, wherein the steps of searching for the good address mark signal further comprise:
   determining whether an address mark has been detected;
   de-asserting the read gate if it is determined that an address mark has been detected; and
   determining whether the detected address mark qualifies as the good address mark.

5. The method of claim 4, wherein if it is determined that the detected address music qualifies as the good address mark, the transducer polarity detection routine further comprising setting the servo gate period duration to a time corresponding to one servo sector.

6. The method of claim 3, and further comprising:
   performing the transducer polarity detection routine for each of a plurality of transducers to determine a polarity for each transducer; and
   storing the polarity for each of the plurality of transducers.

7. The method of claim 6, and further comprising:
   determining if a predetermined number of consecutive errors have occurred; and
   if the predetermined number of consecutive errors have occurred, then performing the transducer polarity detection routine to determine whether a polarity flip has occurred.

8. The method of claim 7, and further comprising updating the stored polarity for any transducer which is determined to have had a polarity flip.

9. An apparatus comprising:
a transducer;
a channel coupled to the transducer; and
circuitry coupled to the channel and configured to perform a transducer polarity detection routine comprising the steps:
  searching for a good address mark signal using the transducer during a first read gate period with a channel polarity set to a first polarity;
  toggling the polarity of the channel to a second polarity if the good address mark is not found during the first read gate period;
  searching for the good address mark during a second read gate period with the channel polarity set to the second polarity;
  identifying a polarity of the transducer based upon the channel polarity when the good address mark is detected.

10. The apparatus of claim 9, wherein the transducer polarity detection routine further comprises repeating the steps of searching for the good address mark during subsequent read gate periods until the good address mark is found, the polarity of the channel being toggled between the first and second polarities after the completion of each read gate period in which the good address mark is not found.

11. The apparatus of claim 10, and further comprising setting a read gate period duration to a first value by setting a servo gate period duration to a time corresponding to a predetermined number of servo sectors.

12. The apparatus of claim 11, Wherein the transducer polarity detection routine steps of searching for the good address mark signal further comprise:
  determining whether an address mark has been detected;
  de-asserting the read gate if it is determined that an address mark has been detected; and
  determined whether the detected address mark qualifies as the good address mark.

13. The apparatus of claim 12, wherein if it is determined that the detected address mark qualifies as the good address mark, the transducer polarity detection routine further comprising setting the servo gate period duration to a time corresponding to one servo sector.

14. The apparatus of claim 10, and further comprising a plurality of transducers, wherein the circuitry is further configured to perform a method comprising:
  performing the transducer polarity detection routine for each of the plurality of transducers to determine a polarity for each transducer; and
  storing the polarity for each of the plurality of transducers.

15. The apparatus of claim 14, wherein the method further comprises:
  determining if a predetermined number of consecutive errors have occurred; and
  if the predetermined number of consecutive errors have occurred, then performing the transducer polarity detection routine to determine whether a polarity flip has occurred.

16. The apparatus of claim 15, wherein the method further comprises updating the stored polarity fur any transducer which is determined to have bad a polarity flip.

* * * * *